US011060463B2

United States Patent
Banks et al.

(10) Patent No.: US 11,060,463 B2
(45) Date of Patent: *Jul. 13, 2021

(54) MODULATED COMBUSTOR BYPASS AND COMBUSTOR BYPASS VALVE

(71) Applicant: United Technologies Corporation, Farmington, CT (US)

(72) Inventors: Anton G. Banks, Manchester, CT (US); Stephen K. Kramer, Cromwell, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 251 days.

This patent is subject to a terminal disclaimer.

(21) Appl. No.: 15/864,266

(22) Filed: Jan. 8, 2018

(65) Prior Publication Data

US 2019/0211751 A1 Jul. 11, 2019

(51) Int. Cl.
| | |
|---|---|
| *F02C 9/18* | (2006.01) |
| *F02C 9/22* | (2006.01) |
| *F23R 3/26* | (2006.01) |
| *F02C 9/54* | (2006.01) |
| *F02C 6/08* | (2006.01) |

(52) U.S. Cl.
CPC .............. *F02C 9/18* (2013.01); *F02C 9/22* (2013.01); *F23R 3/26* (2013.01); *F02C 6/08* (2013.01); *F02C 9/54* (2013.01)

(58) Field of Classification Search
CPC ...... F02C 6/08; F02C 9/18; F02C 9/22; F01D 17/145; F01D 17/162; F23R 3/26; F05D 2220/323; F05D 2240/35
See application file for complete search history.

(56) References Cited

U.S. PATENT DOCUMENTS

| | | | | |
|---|---|---|---|---|
| 3,899,881 | A | * 8/1975 | Arvin ...................... | F23R 3/26 60/39.23 |
| 3,930,368 | A | * 1/1976 | Anderson ................. | F23R 3/26 60/39.23 |
| 3,958,413 | A | * 5/1976 | Cornelius ................. | F23R 3/14 60/778 |

(Continued)

FOREIGN PATENT DOCUMENTS

| | | |
|---|---|---|
| CN | 101769178 A | 7/2010 |
| GB | 2530629 A | 3/2016 |

OTHER PUBLICATIONS

European Search Report Issued in EP Application No. 19150786.2, dated May 9, 2019, 98 Pages.

*Primary Examiner* — William H Rodriguez
(74) *Attorney, Agent, or Firm* — Cantor Colburn LLP (57) ABSTRACT

A combustor section of a gas turbine engine includes a combustor having a combustor inlet, and a combustor bypass passage having a passage inlet located upstream of the combustor inlet, the combustor bypass passage configured to divert a selected bypass airflow around the combustor. A combustor bypass valve is located at the combustor bypass passage to control the selected bypass airflow along the combustor bypass passage. The combustor bypass valve including a valve element configured to rotate about an engine central longitudinal axis A to move one or more valve openings relative to one or more bypass passage openings.

17 Claims, 7 Drawing Sheets

(56) References Cited

U.S. PATENT DOCUMENTS

| | | | | |
|---|---|---|---|---|
| 5,557,920 | A * | 9/1996 | Kain | F23R 3/26 |
| | | | | 60/39.23 |
| 5,596,871 | A * | 1/1997 | Lenertz | F02C 9/28 |
| | | | | 60/39.281 |
| 5,924,276 | A | 7/1999 | Mowill | |
| 6,220,035 | B1 | 4/2001 | Lenertz et al. | |
| 6,892,543 | B2 * | 5/2005 | Nakae | F23R 3/06 |
| | | | | 60/39.23 |
| 7,096,675 | B2 * | 8/2006 | Jonsson | F23R 3/26 |
| | | | | 60/794 |
| 7,340,880 | B2 * | 3/2008 | Magoshi | F23R 3/045 |
| | | | | 60/39.23 |
| 7,631,504 | B2 * | 12/2009 | Belsom | F01D 9/023 |
| | | | | 60/39.23 |
| 8,522,528 | B2 * | 9/2013 | Faulder | F02C 9/18 |
| | | | | 60/231 |
| 9,291,350 | B2 * | 3/2016 | Melton | F23R 3/26 |
| 2015/0377127 | A1 * | 12/2015 | Di Benedetto | F02C 6/08 |
| | | | | 415/144 |
| 2016/0201491 | A1 | 7/2016 | Surace et al. | |
| 2018/0340468 | A1 * | 11/2018 | Takamura | F01D 11/24 |
| 2019/0113232 | A1 * | 4/2019 | Banks | F01D 17/105 |
| 2019/0383220 | A1 * | 12/2019 | Mackin | B64D 15/02 |
| 2020/0018240 | A1 * | 1/2020 | Galle | F02C 9/18 |

* cited by examiner

MODULATED COMBUSTOR BYPASS AND COMBUSTOR BYPASS VALVE

BACKGROUND

Exemplary embodiments pertain to the art of gas turbine engines, and more particularly to combustor and turbine operation of gas turbine engines.

Some gas turbine engines are configured a variable-area turbine (VAT), in which the turbine flow area is changeable during operation of the gas turbine engine. In some VATs, the turbine flow area is changed by adjusting positions of the turbine vanes. The change in turbine flow area changes the fuel air factor (FAF) of the combustor upstream of the turbine, however, which may have detrimental effects on the operation and efficiency of the combustor.

BRIEF DESCRIPTION

In one embodiment, a combustor section of a gas turbine engine includes a combustor having a combustor inlet, and a combustor bypass passage having a passage inlet located upstream of the combustor inlet, the combustor bypass passage configured to divert a selected bypass airflow around the combustor. A combustor bypass valve is located at the combustor bypass passage to control the selected bypass airflow along the combustor bypass passage. The combustor bypass valve including a valve element configured to rotate about an engine central longitudinal axis A to move one or more valve openings relative to one or more bypass passage openings.

Additionally or alternatively, in this or other embodiments the valve element is a tubular sleeve, with the one or more valve openings located in the sleeve.

Additionally or alternatively, in this or other embodiments the valve element is driven about the engine central longitudinal axis A by one or more actuators.

Additionally or alternatively, in this or other embodiments the combustor inlet is configured to be in an aerodynamically choked state when a flowpath area of a variable area turbine located downstream of the combustor is at a minimum area.

Additionally or alternatively, in this or other embodiments the combustor bypass valve is located upstream of a combustor inlet choke location.

Additionally or alternatively, in this or other embodiments the combustor bypass valve is configured to move from a closed position toward a fully open position as the flowpath area of the variable area turbine is increased.

Additionally or alternatively, in this or other embodiments the combustor bypass passage includes a passage outlet located at a turbine section of the gas turbine engine.

Additionally or alternatively, in this or other embodiments the combustor bypass valve is located at the passage inlet.

In another embodiment, a gas turbine engine includes a variable area turbine, configured such that a flowpath area of the variable area turbine is selectably changeable, a combustor located upstream of the variable area turbine and having a combustor inlet, and a combustor bypass passage having a passage inlet located upstream of the combustor inlet and downstream of a compressor section of the gas turbine engine. The combustor bypass passage is configured to divert a selected bypass airflow around the combustor. A combustor bypass valve is located at the combustor bypass passage to control the selected bypass airflow along the combustor bypass passage. The combustor bypass valve includes a valve element configured to rotate about an engine central longitudinal axis A to move one or more valve openings relative to one or more bypass passage openings.

Additionally or alternatively, in this or other embodiments the valve element is a tubular sleeve, with the one or more valve openings located in the sleeve.

Additionally or alternatively, in this or other embodiments the valve element is driven about the engine central longitudinal axis A by one or more actuators.

Additionally or alternatively, in this or other embodiments the combustor inlet is configured to be in an aerodynamically choked state when the flowpath area of the variable area turbine is at a minimum area.

Additionally or alternatively, in this or other embodiments the combustor bypass valve is located upstream of a combustor inlet choke location.

Additionally or alternatively, in this or other embodiments the combustor bypass valve is configured to move from a closed position toward a fully open position as the flowpath area of the variable area turbine is increased.

Additionally or alternatively, in this or other embodiments the variable area turbine includes one or more turbine vanes, the one or more turbine vanes configured to be movable, thereby changing the flowpath area.

Additionally or alternatively, in this or other embodiments the one or more turbine vanes are movable about a vane axis.

Additionally or alternatively, in this or other embodiments the combustor bypass passage includes a passage outlet located at the variable area turbine.

Additionally or alternatively, in this or other embodiments the combustor bypass valve is located at the passage inlet.

In yet another embodiment, a method of operating a gas turbine engine includes adjusting an area of a turbine section of the gas turbine, and bypassing, in response to said adjusting step, a portion of core airflow entering a combustor section around a combustion chamber.

Additionally or alternatively, in this or other embodiments the bypassing the portion of core airflow includes rotating a valve element about an engine central longitudinal axis A to move one or more valve openings relative to one or more bypass passage openings, and flowing the portion of core airflow through the one or more bypass passage openings via the one or more valve openings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
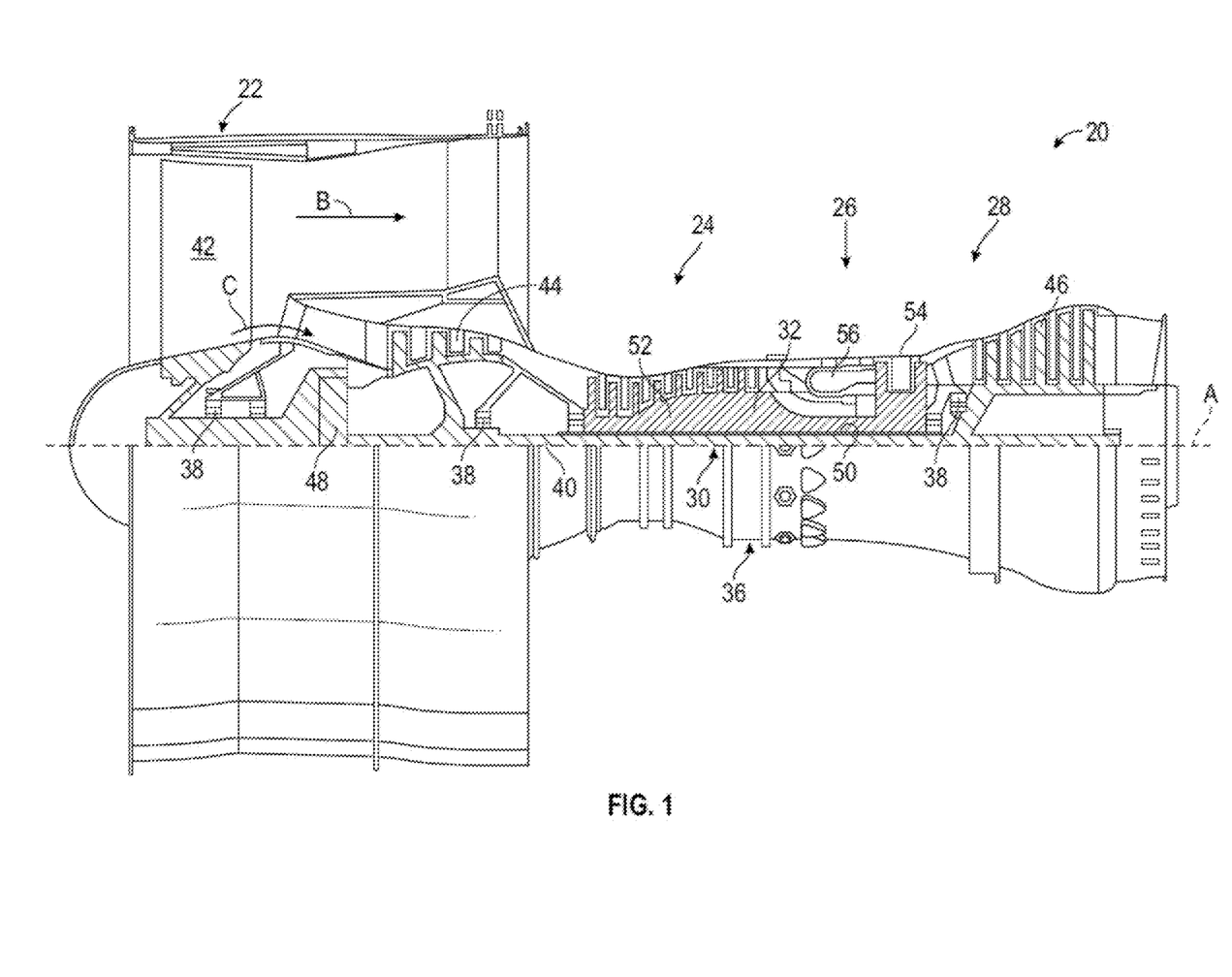
FIG. 1 is schematic cross-sectional view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\,°R)/(518.7°R)]^{0.5}$. The "Low corrected fan tip speed" as disclosed herein according to one non-limiting embodiment is less than about 1150 ft/second (350.5 m/sec).

Figure 2:
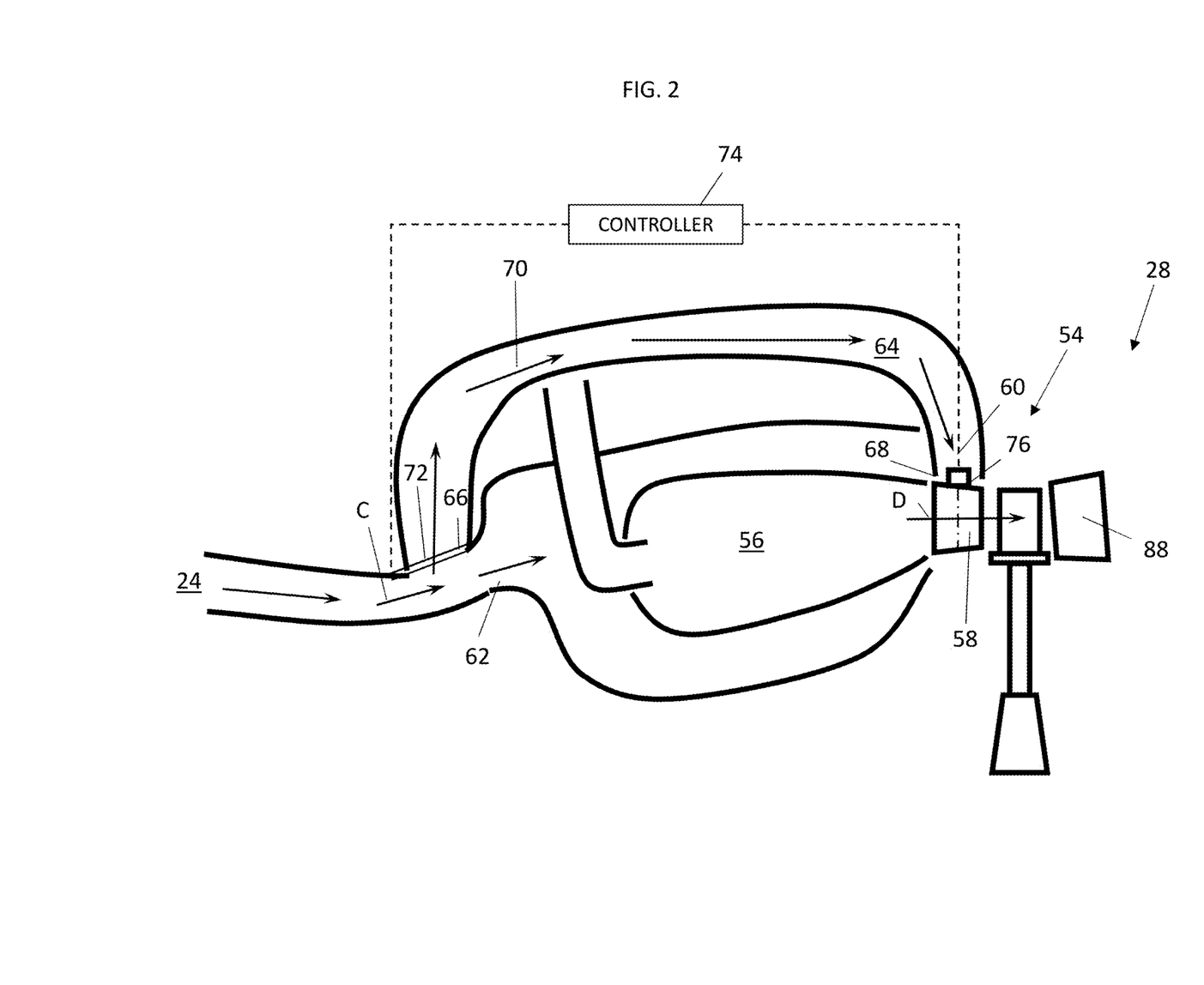
FIG. 2 is a schematic view of a combustor section and turbine section of an embodiment of a gas turbine engine.
Figure 3:
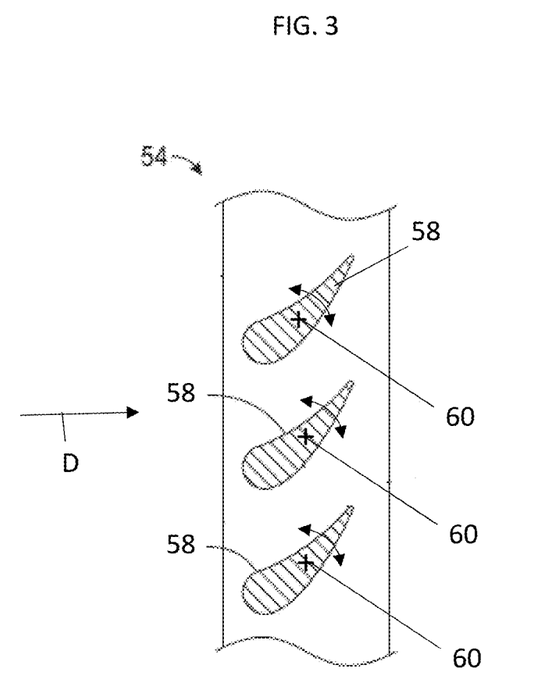
FIG. 3 is a schematic view of a vane row of an embodiment of a variable-area turbine (VAT) of a gas turbine engine.

Referring now to FIG. 2, the turbine section 28, for example, the high pressure turbine 54 is configured as a variable-area turbine (VAT), such that flow area of combustion products from the combustor 56 along a flowpath D is changeable. In one embodiment, as illustrated in FIGS. 2 and 3, the flow area is changed using variable turbine vanes 58 that rotate about a vane axis 60. It is to be appreciated that in other embodiments the flow area may be changed in other ways including changing the position of the turbine vanes 58 by sliding rather than rotating, or by moving other flowpath structure relative to the turbine vanes 58 to change the area of flowpath D. The stator vanes 58 direct the core flow to turbine rotor blades 88.

Referring again to FIG. 2, the combustor 56 includes a combustor inlet 62 to receive airflow from the high pressure compressor 24 along the core flowpath C, and to direct the airflow into the combustor 56. The combustor inlet 62 is configured with an inlet cross-sectional area in which the airflow through the combustor inlet 62 is aerodynamically choked, or at a maximum flow velocity, when the turbine vanes 58 are positioned such that the area of flowpath D is at its minimum.

Figure 4:
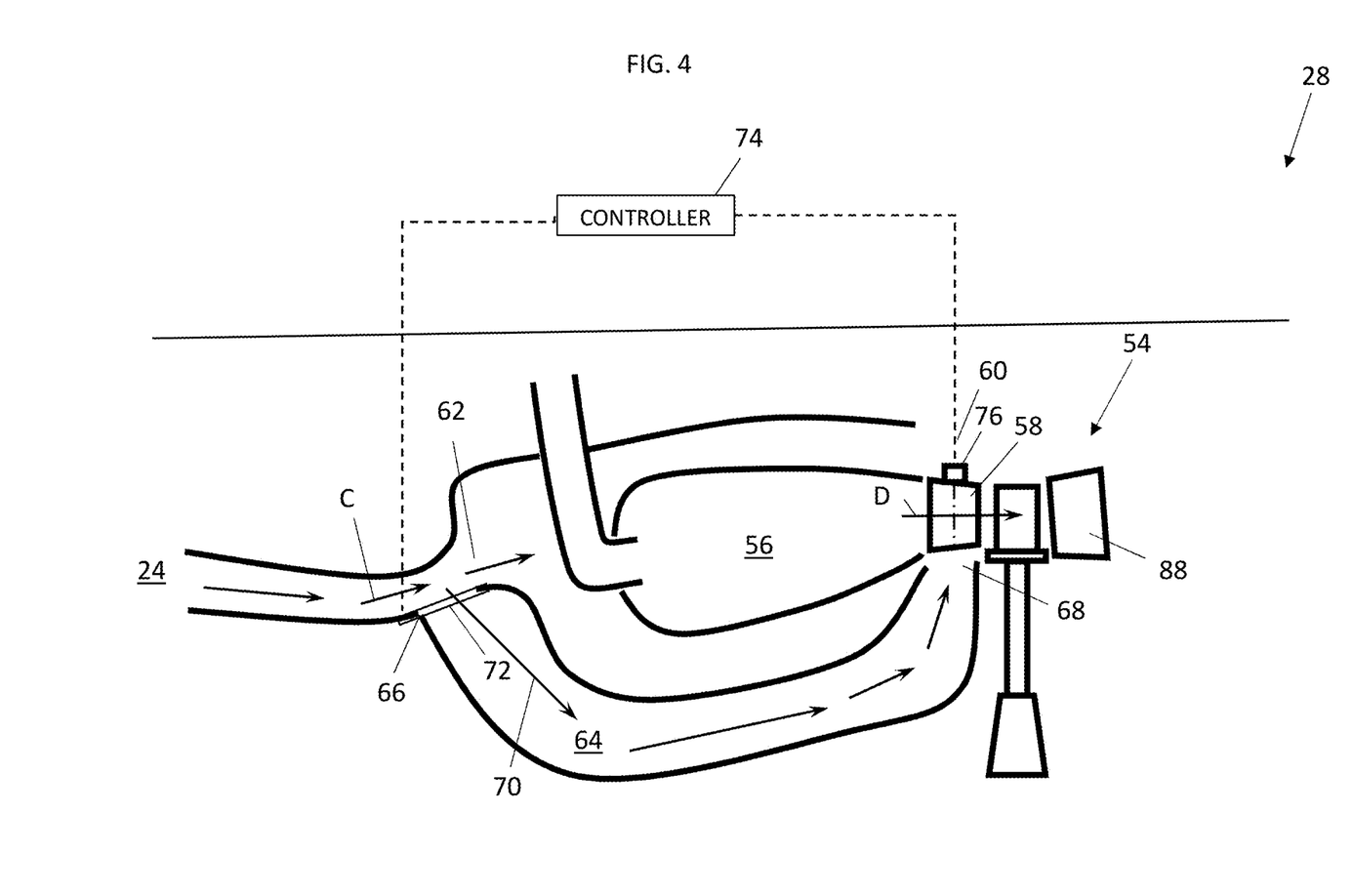
FIG. 4 is another schematic view of a combustor section and turbine section of a gas turbine engine.

A combustor bypass passage 64 is positioned with a bypass inlet 66 along flowpath C upstream of the combustor inlet 62, and includes a bypass outlet 68 at the turbine section 28. Further, the bypass inlet 66 is located downstream of the compressor section 24. The bypass passage 64 is configured to direct a bypass airflow 70 around the combustor 56 from core flowpath C upstream of the combustor 56 and reintroduce the bypass airflow into the flowpath D at the turbine section 28, for example, at the high pressure turbine 54 at the variable turbine blades 58, or alternatively downstream of the variable turbine blades 58. While the bypass passage 64 shown in FIG. 2 is located radially outboard of the combustor 56, between the combustor and the engine central longitudinal axis A, in other embodiments the bypass passage 64 may be in another location, such as radially inboard of the combustor 56, as shown in FIG. 4.

A combustor bypass valve 72 is located along the main gas path 24, for example, at the bypass inlet 66 such as in the embodiment illustrated in FIG. 2. It is to be appreciated, however, that the combustor bypass valve 72 may be positioned at other locations, such as along the bypass passage 64, such as at the bypass outlet 68 or at a location between the bypass inlet 66 and the bypass outlet 68. In some embodiments, the combustor bypass valve 72 extends about the engine central longitudinal axis A, and configured to rotate about the engine central longitudinal axis A as will be described in greater detail below Further, it is to be appreciated that other valve types may be utilized.

Since the combustor inlet 62 is configured to be aerodynamically choked when the turbine vanes 58 are positioned such that the area of flowpath D is at its minimum, excess airflow that cannot flow through the combustor inlet 62 because of the choked condition may be diverted through the bypass passage 64. As the area of flowpath D is increased from its minimum, a greater amount of airflow may be diverted through the bypass passage 64. The combustor bypass valve 72 regulates airflow through the bypass passage 64, to maintain the aerodynamically choked condition at the combustor inlet 62, thereby maintaining a selected level of combustor stability and efficiency, even with changes in the area of flowpath D.

To achieve this aim, the position of the combustor bypass valve 72 is scheduled relative to flowpath D area, which in some embodiments corresponds to a position of turbine vanes 58. Further, the scheduling may additionally take into account other operational parameters. The combustor bypass valve 72 is operably connected to a controller 74, for example a full authority digital engine control (FADEC) along with a turbine vane actuation system shown schematically at 76 such that as the vane actuation system 76 moves turbine vanes 58 thus changing the flowpath D area, the controller 74 directs a change to the position of combustor bypass valve 72. For example, as the turbine vanes 58 are articulated to increase the flowpath D area, the combustor bypass valve 72 is moved to an increased open position to allow a greater airflow through the bypass passage 64. Likewise as the flowpath D area is decreased, the combustor valve 72 is moved to a more closed position to restrict the airflow through the bypass passage 64 to maintain the choked condition at the combustor inlet 62.

Referring now to FIG. 4, another embodiment is illustrated in which the bypass passage 64 is located radially inboard of the combustor 56, rather than radially outboard of the combustor 56 as in the embodiment of FIG. 2. Placement of the bypass passage 64 may depend on many factors, including available space for the bypass passage 64 and desired cross-sectional area of the bypass passage 64.

Figure 5:
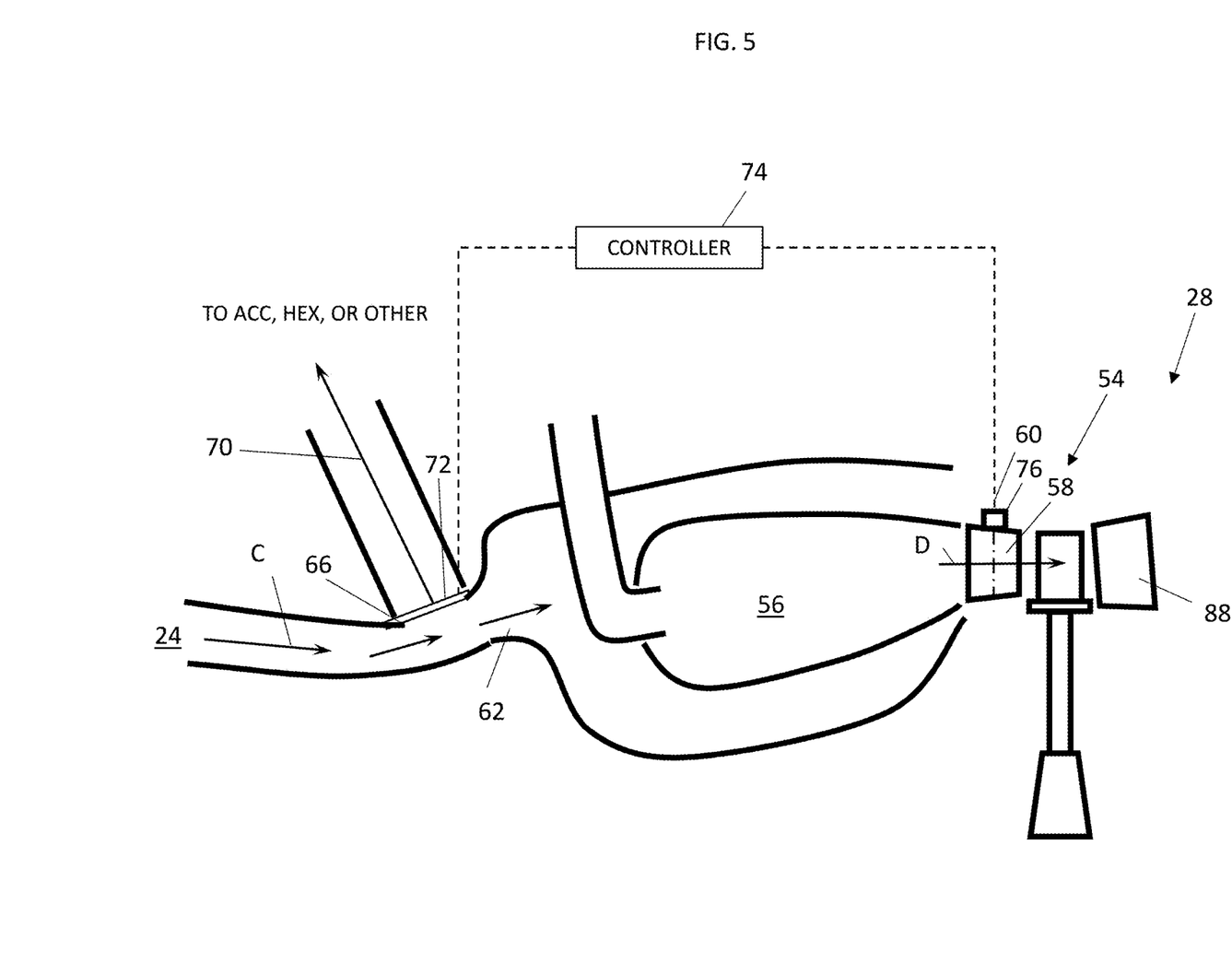
FIG. 5 is yet another schematic view of a combustor section and turbine section of a gas turbine engine.

In yet another embodiment, illustrated in FIG. 5, the bypass airflow 70 is directed along the bypass passage 64 to another system connected to the gas turbine engine 20, such as an active cooling control (ACC) system, a heat exchanger (HEX) system, or the like.

Figure 6:
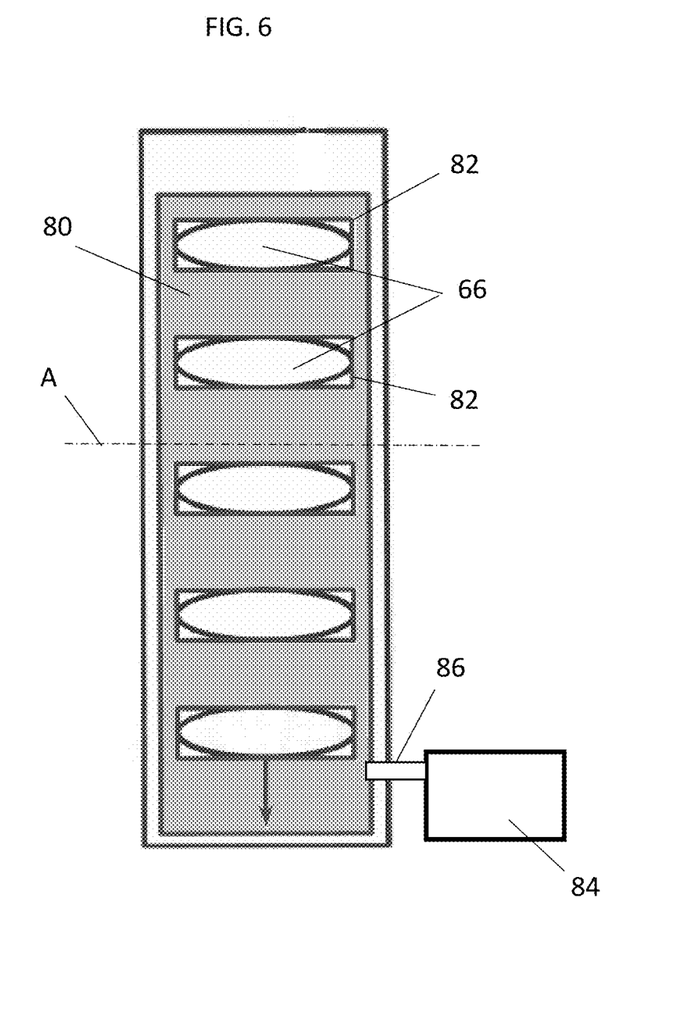
FIG. 6 is a view of an embodiment of a combustor bypass valve in a fully opened position.
Figure 7:
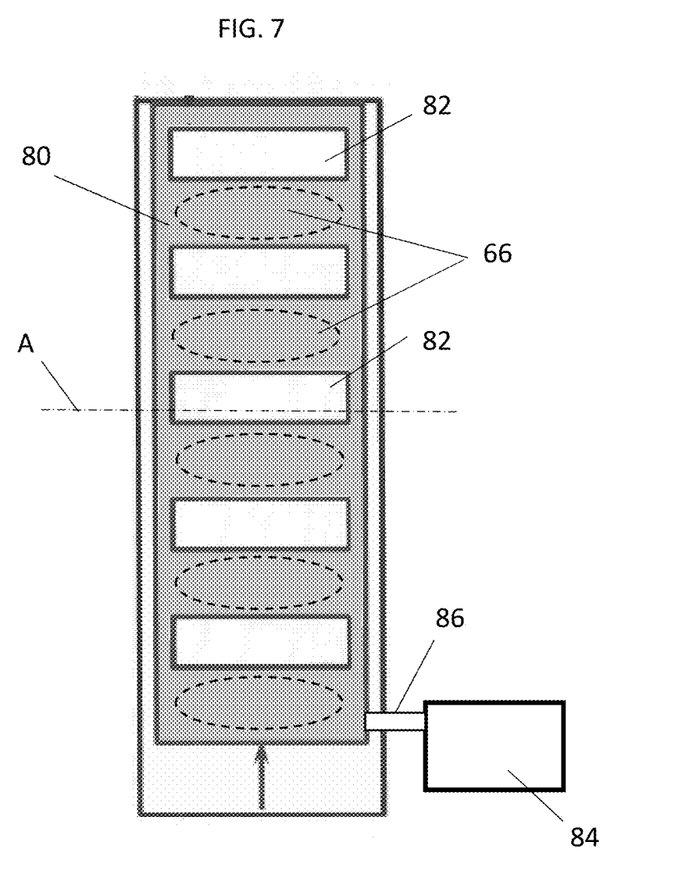
FIG. 7 is a view of an embodiment of a combustor bypass valve in a fully closed position.

Referring now to FIGS. 6 and 7, an exemplary combustor valve 72 is illustrated. The combustor valve 72 includes a valve element 80, which extends circumferentially about the engine central longitudinal axis A. in some embodiments, the valve element 80 is a full ring, while in other embodiments the valve element 80 is segmented. The valve element 80 includes a plurality of valve openings 82. The valve element 80 is movable about the engine central longitudinal axis A to move the plurality of valve openings 82 into and out of alignment with bypass inlet openings 66 thus regulating flow through the bypass passage 64 via the valve openings 82. FIG. 6 schematically illustrates the combustor valve 72 in an open position, with the valve openings 82 aligned with the bypass inlet openings 66. FIG. 7, on the other hand, illustrates the combustor valve 72 in a closed position, with the valve openings 82 out of alignment with the bypass inlet openings 66 so the bypass inlet openings 66 are covered, preventing flow into the bypass passage 64. While a fully open position and a fully closed position are illustrated in FIG. 6 and FIG. 7, respectively, it is to be appreciated that in some embodiments, the combustor valve 72 may have one or more intermediate, partially-open positions between the fully open position and the fully closed position in which the valve openings 82 are partially aligned with the bypass inlet openings 66. Further, the size, shape and number of bypass inlet openings 66 and valve openings 82 illustrated are merely exemplary, and may be varied based on system requirements, allowing airflow bypass the combustor while also minimizing the aerodynamic effects on the combustor.

As shown in FIG. 6, the valve element 80 is driven around the engine central longitudinal axis A by a valve actuator 84 connected to the valve element 80 either directly, or through a linkage arrangement 86. Upon receiving commands from the controller 74, the valve actuator 84 drives movement of the valve element 80. With the valve openings 82 at least partially aligned with the bypass inlet openings 66, a portion of core airflow flows through the valve openings 80 and bypass inlet openings 66 to flow along the bypass passage 64 as bypass airflow 70.

The arrangements disclosed herein provide for adjusting mass flow of the airflow into the combustor 56 such that the combustor 56 operation is tolerant to changes of turbine flowpath D area. This stabilizes operation of the combustor while also attaining the benefits of the variable turbine flowpath D.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A combustor section of a gas turbine engine, comprising:
   a combustor having a combustor inlet;
   a combustor bypass passage having a passage inlet disposed upstream of the combustor inlet relative to a direction of airflow through the combustor, the combustor bypass passage configured to direct a selected bypass airflow around the combustor;
   a combustor bypass valve disposed at the combustor bypass passage to control the selected bypass airflow along the combustor bypass passage, the combustor bypass valve including an annular valve element extending around an engine central longitudinal axis (A) and configured to rotate around the engine central longitudinal axis A to move one or more valve openings relative to one or more bypass passage openings, the combustor bypass valve configured to direct the selected bypass airflow into the combustor bypass passage; and
   wherein the combustor bypass valve is operably connected to a variable area turbine such that the combustor bypass valve is moved from a closed position toward a fully open position as a flowpath area of the variable area turbine is increased.

2. The combustor section of claim 1, wherein the annular valve element is a tubular sleeve, with the one or more valve openings disposed in the sleeve.

3. The combustor section of claim 1, wherein the annular valve element is driven around the engine central longitudinal axis A by one or more actuators.

4. The combustor section of claim 1, wherein the combustor inlet is configured to be in an aerodynamically choked state when the flowpath area of the variable area turbine disposed downstream of the combustor is at a minimum area.

5. The combustor section of claim 4, wherein the combustor bypass valve is disposed upstream of a combustor inlet choke location.

6. The combustor section of claim 1, wherein the combustor bypass passage includes a passage outlet disposed at a turbine section of the gas turbine engine.

7. The combustor section of claim 1, wherein the combustor bypass valve is disposed at the passage inlet.

8. A gas turbine engine, comprising:
   a variable area turbine, configured such that a flowpath area of the variable area turbine is selectably changeable;
   a combustor disposed upstream of the variable area turbine, the combustor having a combustor inlet;
   a combustor bypass passage having a passage inlet disposed upstream of the combustor inlet and downstream of a compressor section of the gas turbine engine relative to a direction of airflow through the combustor, the combustor bypass passage configured to direct a selected bypass airflow around the combustor; and
   a combustor bypass valve disposed at the combustor bypass passage to control the selected bypass airflow along the combustor bypass passage, the combustor bypass valve including an annular valve element extending around an engine central longitudinal axis (A) and configured to rotate around the engine central longitudinal axis A to move one or more valve openings relative to one or more bypass passage openings, the combustor bypass valve configured to direct the selected bypass airflow into the combustor bypass passage; and
   wherein the combustor bypass valve is operably connected to the variable area turbine such that the combustor bypass valve is moved from a closed position toward a fully open position as a flowpath area of the variable area turbine is increased.

9. The gas turbine engine of claim 8, wherein the annular valve element is a tubular sleeve, with the one or more valve openings disposed in the sleeve.

10. The gas turbine engine of claim 8, wherein the annular valve element is driven around the engine central longitudinal axis A by one or more actuators.

11. The gas turbine engine of claim 8, wherein the combustor inlet is configured to be in an aerodynamically choked state when the flowpath area of the variable area turbine is at a minimum area.

12. The gas turbine engine of claim 11, wherein the combustor bypass valve is disposed upstream of a combustor inlet choke location.

13. The gas turbine engine of claim 8, wherein the variable area turbine includes one or more turbine vanes, the one or more turbine vanes configured to be movable, thereby changing the flowpath area.

14. The gas turbine engine of claim 13, wherein the one or more turbine vanes are movable about a vane axis.

15. The gas turbine engine of claim 8, wherein the combustor bypass passage includes a passage outlet disposed at the variable area turbine.

16. The gas turbine engine of claim 8, wherein the combustor bypass valve is disposed at the passage inlet.

17. A method of operating a gas turbine engine, comprising:
    adjusting an area of a variable area turbine section of the gas turbine; and
    bypassing via a combustor bypass valve, in response to said adjusting step, a portion of core airflow entering a combustor section around a combustion chamber;
    wherein the bypassing the portion of core airflow comprises:
       rotating an annular valve element of the combustor bypass valve extending around an engine central longitudinal axis (A) around the engine central longitudinal axis A to move one or more valve openings relative to one or more bypass passage openings; and
       flowing the portion of core airflow through the one or more bypass passage openings via the one or more valve openings;
    wherein the combustor bypass valve is operably connected to the variable area turbine section such that the combustor bypass valve is moved from a closed position toward a fully open position as a flowpath area of the variable area turbine section is increased.

* * * * *